United States Patent
Graham et al.

(10) Patent No.: US 10,273,869 B2
(45) Date of Patent: Apr. 30, 2019

(54) PRECHAMBER IGNITION DEVICE FOR INTERNAL COMBUSTION ENGINE, AND METHOD

(71) Applicant: Caterpillar Inc., Peoria, IL (US)

(72) Inventors: Curtis Graham, Peoria, IL (US); Daniel Cavanaugh, Chillicothe, IL (US)

(73) Assignee: Caterpillar Inc., Deerfield, IL (US)

( * ) Notice: Subject to any disclaimer, the term of this patent is extended or adjusted under 35 U.S.C. 154(b) by 90 days.

(21) Appl. No.: 15/294,045

(22) Filed: Oct. 14, 2016

(65) Prior Publication Data
US 2018/0106182 A1   Apr. 19, 2018

(51) Int. Cl.
| | | |
|---|---|---|
| *F02B 19/16* | (2006.01) | |
| *F02B 19/12* | (2006.01) | |
| *F02B 19/10* | (2006.01) | |
| *F02B 77/02* | (2006.01) | |
| *F02B 19/00* | (2006.01) | |

(52) U.S. Cl.
CPC .......... *F02B 19/16* (2013.01); *F02B 19/1004* (2013.01); *F02B 19/12* (2013.01); *F02B 77/02* (2013.01); *F02B 2019/006* (2013.01); *Y02T 10/125* (2013.01)

(58) Field of Classification Search
CPC ................. F02B 19/16; F02B 19/12
See application file for complete search history.

(56) References Cited

U.S. PATENT DOCUMENTS

| | | | |
|---|---|---|---|
| 3,738,333 A | | 6/1973 | Vogelsang |
| 4,426,966 A | | 1/1984 | Huether Werner et al. |
| 4,676,207 A | | 6/1987 | Kawamura et al. |
| 4,681,074 A | * | 7/1987 | Ogawa .................. F02B 19/165 123/270 |
| 5,222,993 A | * | 6/1993 | Crane ...................... F02B 19/12 123/256 |
| 5,392,744 A | * | 2/1995 | Regueiro ................. F02B 19/18 123/262 |
| 5,520,148 A | * | 5/1996 | Kawamura ........... F02B 19/165 123/254 |
| 5,778,849 A | * | 7/1998 | Regueiro ............ F02B 19/1004 123/254 |
| 5,915,351 A | * | 6/1999 | Regueiro ................ F02B 19/16 123/254 |
| 6,016,785 A | * | 1/2000 | Divecha .............. F02B 19/1004 123/254 |
| 6,843,220 B2 | * | 1/2005 | Lausch ...................... F02B 1/12 123/261 |
| 9,151,212 B2 | * | 10/2015 | Dumser .............. F02B 19/1014 |
| 9,172,217 B2 | * | 10/2015 | Hampson ................ H01T 13/54 |
| 9,217,360 B2 | * | 12/2015 | Pierz ....................... F02B 19/16 |

(Continued)

FOREIGN PATENT DOCUMENTS

| | | | | |
|---|---|---|---|---|
| DE | 102015203493 A1 | * | 3/2016 | ............ F02B 19/108 |
| EP | 2205840 B1 | | 2/2012 | |
| WO | 2012113002 | | 8/2012 | |

*Primary Examiner* — David E Hamaoui
(74) *Attorney, Agent, or Firm* — Jonathan F. Yates

(57) ABSTRACT

A prechamber ignition device in an internal combustion engine is provided having a body piece formed of a first type of material and a tip piece formed of a second type of material. A distal end of the body piece has a cladding, which may be of the second type of material, for preventing corrosion of the first type of material from which the body piece is formed.

11 Claims, 5 Drawing Sheets

(56) References Cited

U.S. PATENT DOCUMENTS

| | | | |
|---|---|---|---|
| 9,371,771 B2* | 6/2016 | Lee | F02M 21/0275 |
| 9,890,689 B2* | 2/2018 | Hampson | F02B 19/1085 |
| 2008/0309057 A1 | 12/2008 | Richter et al. | |
| 2014/0225497 A1 | 8/2014 | Woerner et al. | |
| 2016/0237879 A1* | 8/2016 | Rowan | F02B 19/1009 |
| 2018/0058305 A1* | 3/2018 | Graham | F02B 19/1009 |

* cited by examiner

US 10,273,869 B2

PRECHAMBER IGNITION DEVICE FOR INTERNAL COMBUSTION ENGINE, AND METHOD

TECHNICAL FIELD

The present disclosure relates generally to a prechamber ignition device and, more particularly, to manufacturing and remanufacturing prechamber ignition devices to limit corrosion during service in an internal combustion engine.

BACKGROUND

Combustion engines, including gasoline spark-ignited engines, diesel compression ignition engines, gaseous fuel engines, and still others, operate generally by producing a controlled combustion reaction within a cylinder which drives a piston to rotate a crankshaft. This basic technique has been used to operate engines with traditional fuels such as gasoline or diesel for well over a century. Emissions concerns, price and supply concerns, amongst others, have led to increased interest and exploitation of less traditional fuels such as natural gas, hydrogen, landfill gas, and biogas. These fuels typically are used at a higher stoichiometric air-to-fuel ratio, meaning so-called "lean" fuel/air mixtures, or mixtures having an equivalence ratio less than 1, are common. A traditional combustion engine ignition strategy that relies on a spark plug or compression ignition may fail to properly ignite the mixture resulting in engine knock or other problems.

Use of a prechamber ignition device can address these issues by igniting a fuel/air mixture in a prechamber before delivering a jet of hot, combusting gases to the combustion chamber, resulting in a hotter, more uniform, and more robust combustion reaction as compared to other techniques. A typical prechamber assembly is constructed of a base formed of cast iron or steel, with an attached tip formed of materials well-suited to withstanding regular and intense combustion reactions, such as certain forms of Inconel.

One strategy for extending the life of a prechamber assembly is disclosed in European Patent 2,205,840 to Granlund ("Granlund"). Granlund discloses a prechamber assembly having replaceable parts, such as a cover and a tip piece, allowing for repair of corroded assemblies by replacing individual components instead of the entire assembly. While this and other solutions may extend the life of the assembly overall, the disclosed mechanism for doing so requires regular maintenance and there remains ample room for improvement.

SUMMARY OF THE INVENTION

In one aspect, a prechamber ignition device for an internal combustion engine is disclosed. The device includes a body piece formed at least predominately of a first type of material and structured for positioning within a housing in the engine, and a tip piece formed at least predominately of a second type of material and structured for positioning at least partially within a cylinder in the housing. The tip piece is attached to the body piece such that a distal body end adjoins a prechamber and a fuel outlet is in communication with the prechamber. The body piece defines a longitudinal axis extending between a proximal body end and the distal body end, and having formed therein a fuel passage extending between a fuel inlet and the fuel outlet in the distal body end. The tip piece has the prechamber formed therein and at least one ignition outlet to convey combustion gases from a pilot charge out of the prechamber for igniting a main charge in the cylinder. The prechamber ignition device further includes a cladding located upon the distal body end and exposed to the prechamber so as to shield the first type of material forming the body piece from the combustion gases within the prechamber.

In another aspect, a method of making a prechamber ignition device for an internal combustion engine is disclosed. The method includes attaching a body piece of the prechamber ignition device formed at least predominantly of a first type of material to a tip piece of the prechamber ignition device formed at least predominantly of a second type of material. The body piece has formed therein a fuel passage connecting to a fuel outlet, and the tip piece has formed therein a prechamber placed in fluid communication with the fuel outlet by way of the attaching of the body piece to the tip piece, and at least one ignition outlet from the prechamber. The method also includes forming a cladding upon the body piece such that upon attaching the body piece to the tip piece the cladding is positioned to shield the body piece from combustion gases within the prechamber.

In still another aspect, a pilot ignition system for an internal combustion engine is disclosed. The system includes a housing and a prechamber ignition device positioned within the housing and including a body piece and a tip piece. The body piece is attached to the tip piece. The body piece also has a fuel passage formed therein extending between a fuel inlet and a fuel outlet. The tip piece has a prechamber formed therein and at least one ignition outlet to convey combustion gases from a pilot charge ignited within the prechamber into a cylinder in the internal combustion engine. The body piece is formed at least predominately of a first type of material and the tip piece is formed at least predominately of a second type of material. The prechamber ignition device further includes a cladding located upon the body piece and exposed to the prechamber so as to shield the body piece from the combustion gases within the prechamber.

DETAILED DESCRIPTION

Figure 1:
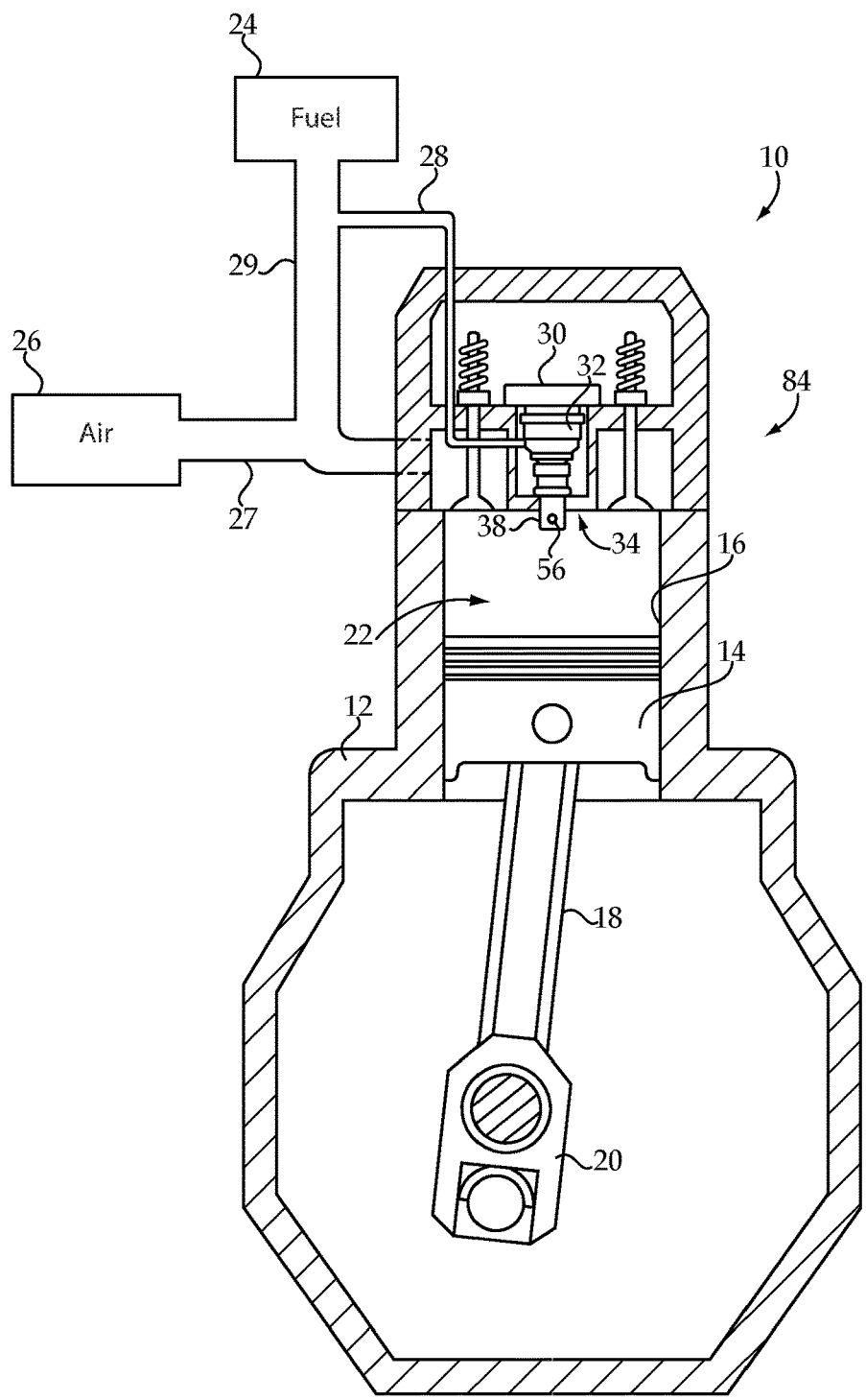
FIG. 1 is a sectioned diagrammatic view of an internal combustion engine having a prechamber ignition device, according to one embodiment.

Referring to FIG. 1 an internal combustion engine 10 having a prechamber ignition device 30 (hereinafter "device) in a pilot ignition system 84 according to one embodiment is shown. Engine 10 includes engine housing 12 also forming an interior structure shaped and sized to house and/or support components of engine 10. Engine 10 may be a four-stroke engine or any other type of combustion engine, that includes one or more prechamber ignition devices 30. Engine 10 may include one or more pistons 14, each piston 14 being within a piston cylinder 16 and movable between a top dead center position and a bottom dead center position to rotate a crankshaft 20 in a generally conventional manner. Piston 14 may be coupled to crankshaft 20 by a connecting rod 18. Device 30 may be supported within engine 10 by an engine head 34, which may be considered part of housing 12, structured to receive device 30 such that ignition outlets 56 in a tip piece 38 of device 30 are positioned in fluid communication with cylinder 16, with tip piece 38 being positioned at least partially within cylinder 16. A fuel supply 24 may be fluidly coupled with device 30 and engine 10 by a first fuel conduit 28 and a second fluid conduit 29, respectively. Air may also be delivered to engine 10 from an air supply 26 by an air intake conduit 27, which may connect with fuel conduit 29. Air for combustion may be conveyed into device 30 as piston 14 moves toward the top dead center position. Device 30 used in engine 10 may be new or a used prechamber ignition device that has been remanufactured, and engine 10 can be a new or a remanufactured engine 10. Other components of engine 10 may be new or used, the used components being remanufactured, refurbished, or repaired. As will be further apparent from the following description, the present disclosure contemplates unique strategies for device remanufacturing considered to enable reuse of devices in situations where the devices would formerly have been discarded, as well as techniques for manufacture of new components.

Figure 2:
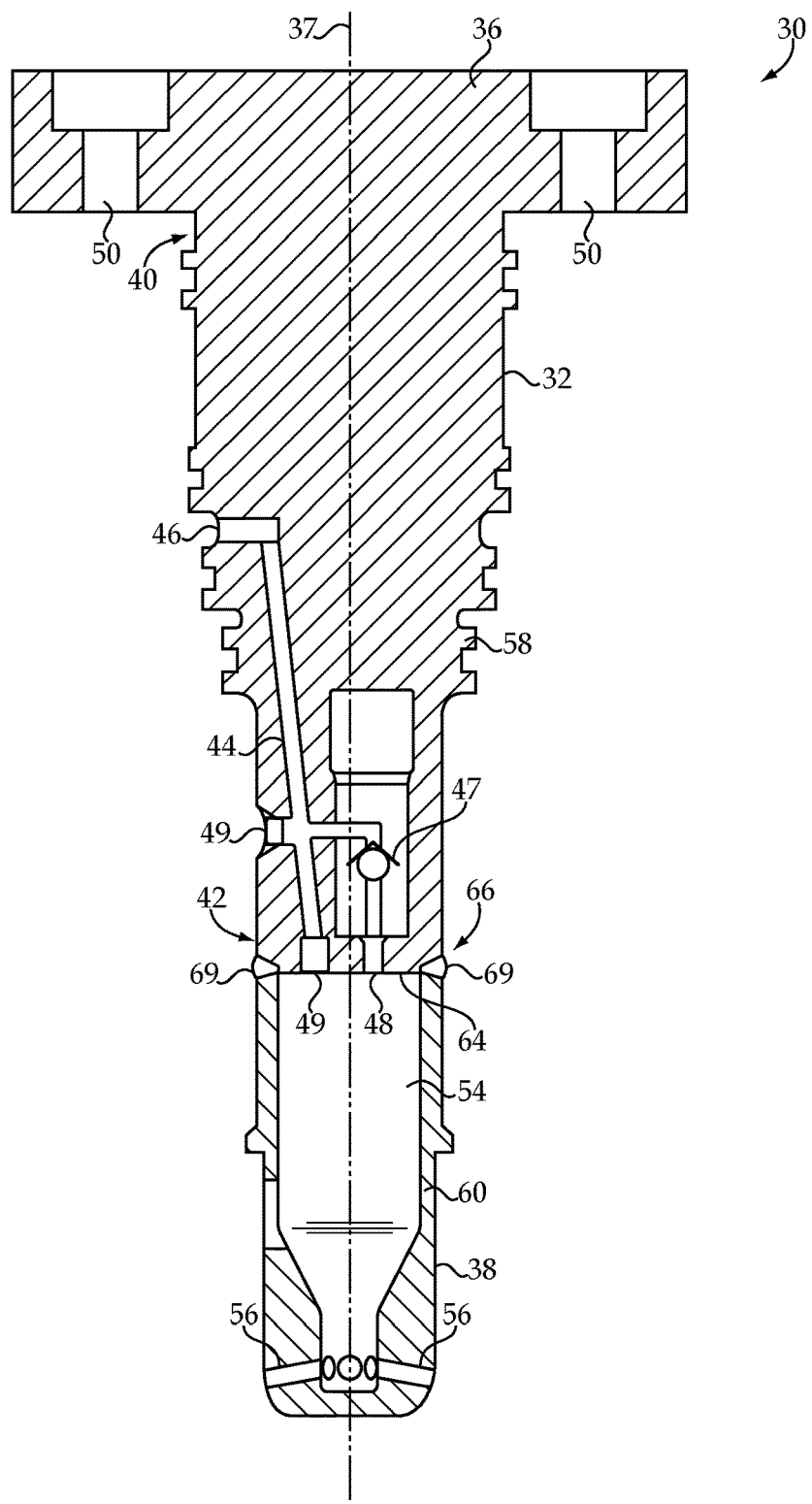
FIG. 2 is a sectioned diagrammatic view of a prechamber ignition device, according to one embodiment.

Referring now also to FIG. 2, a view of device 30 is provided, illustrating device 30 as it may appear having been removed from engine 10 before remanufacturing. As many of the components of device 30 may be the same after remanufacture as they were before remanufacture, except where otherwise indicated, descriptions herein of device 30 can be taken to refer to a used device 30 not yet remanufactured as well as a device 30 after having been remanufactured. Device 30 may include a body piece 32 structured for positioning in housing 12, and tip piece 38. Body piece 32 may be formed of a first type of material 58 that is durable and is suitable for machining, such as cast iron, steel, or any other suitable material. Tip piece 38 may be formed of a second type of material 60 such as a type of Inconel, other nickel and chromium iron alloys, stainless steel, or other materials resistant to high temperature oxidation or corrosion and otherwise suitable for withstanding intense combustion conditions. The second type of material may be any of a variety of superalloys. Body piece 32 may have a proximal body end 40 and a distal body end 42 defining a longitudinal axis 37 extending therebetween, with mounting element 36 at the proximal body end 40. Prechamber 54 may be centered upon longitudinal axis 37. Mounting element 36 may further include a plurality of bores 50 for securing device 30 to head 34 with bolts or the like. Tip piece 38 may be coaxially arranged with body piece 32 and has a plurality of ignition outlets 56 structured to facilitate escape of combustion gases from prechamber 54 to combustion chamber 22, the ignition outlets 56 extending outward from prechamber 54 and spaced circumferentially about longitudinal axis 37 in the illustrated example.

Device 30 may further have a fuel passage 44 formed therein and fluidly coupled with fuel conduit 28, allowing fuel to flow to prechamber 54. Fuel passage 44 may be constructed by boring body piece 32, forming a passageway from a fuel inlet 46 in an exterior side of body piece 32 to a fuel outlet 48 formed in distal body end 42. A plug 49 may be inserted into drilled bores remaining after fuel passage 44 has been formed so as to direct fuel in fuel passage 46 towards fuel outlet 48. Coupling body piece 32 to tip piece 38 places fuel outlet 48 in fluid communication with prechamber 54. In still other embodiments, a fuel injector may be coupled with device 30 to inject fuel directly into prechamber 54. A check valve 47 may be used to prevent flow of air or fluids back through fuel passage 44 towards fuel inlet 46. Once fuel or fuel/air mixture has been delivered to prechamber 54 combustion of a pilot charge may be initiated by an ignition device such as a spark plug (not shown), or potentially by pressurizing the fuel or fuel/air mixture until autoignition occurs. Combustion results in combustion gases expanding rapidly in prechamber 54, escaping via ignition outlets 56 and providing a hotter, more uniform ignition catalyst capable of triggering combustion of lean mixture fuels, or in some instances any fuel mixture, more reliably than an in-cylinder ignition device alone or some other known ignition strategy.

It has been discovered that combustion reactions in prechamber 54, and harsh conditions generally such as temperatures above 600 degrees Celsius or still higher, may cause corrosion in the nature of high temperature oxidation on a distal tip 64 of body piece 32. Corrosion may even work its way up into a connecting joint 66 forming an interface between body piece 32 and tip piece 38, and extending circumferentially around longitudinal axis 37. Corrosion, as used in the present disclosure, may be understood to refer to any physical, chemical, or any other kind of deposits on a surface of body piece 32 forming prechamber 54 or otherwise exposed to heat or combustion gases resulting from combustion reactions in prechamber 54 and exposure to engine conditions generally. Body piece 32 may be coupled to tip piece 38 at connecting joint 66, and secured by weld joint 68 which may include a weld bead 69 extending circumferentially about device 30 at weld joint 68. Weld joint 68 may be formed by laser welding or any of a variety of welding procedures such as electron beam welding, gas metal arc welding, plasma arc welding, or the like.

Figure 3:
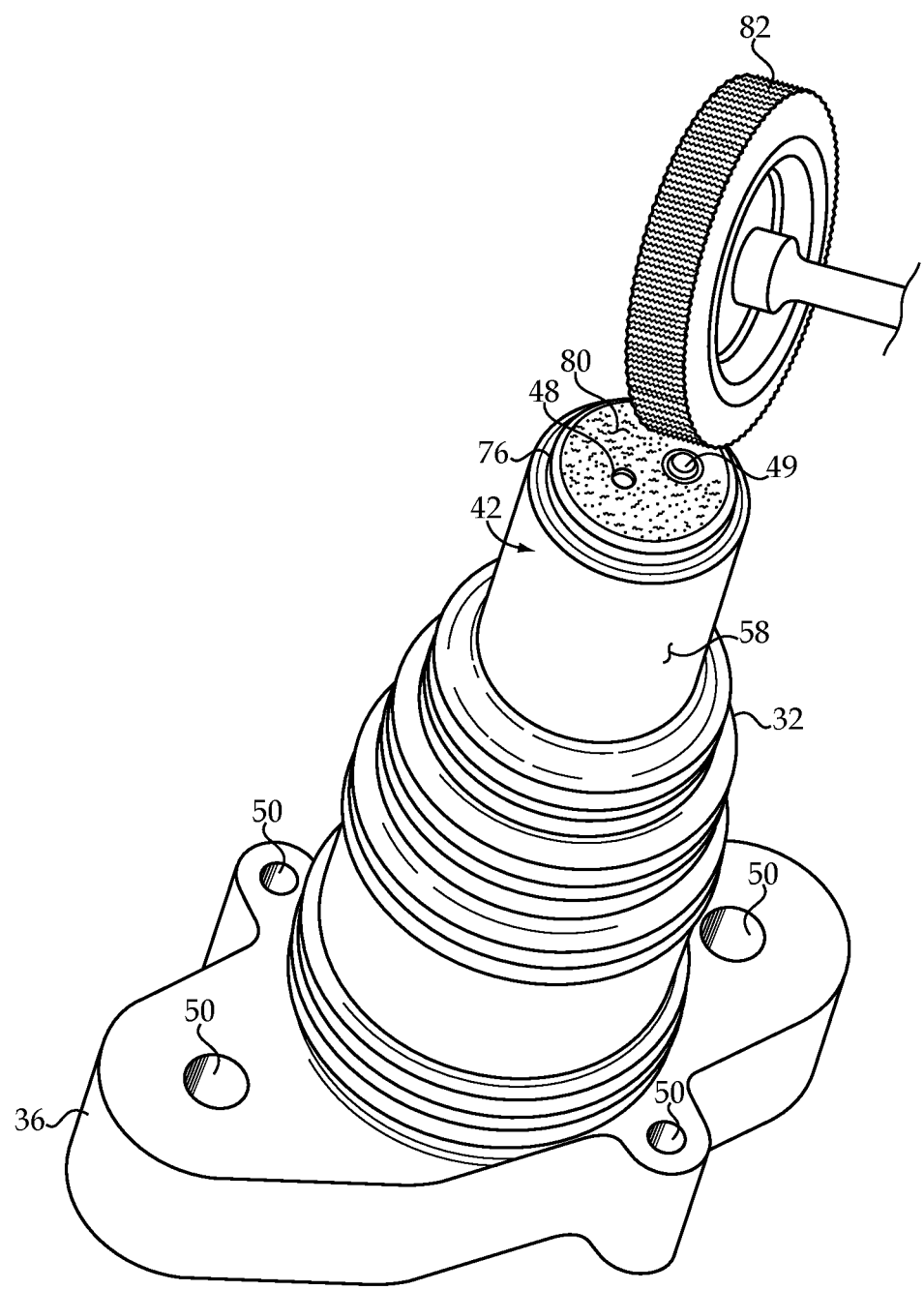
FIG. 3 is a diagrammatic view of a body piece of a prechamber ignition device showing corrosion, according to one embodiment.

Referring now also to FIG. 3, body piece 32 showing corrosion 80 is illustrated. It can be seen in FIG. 3 that body piece 32 has been separated from tip piece 38 (not pictured in FIG. 3). Tip piece 38 may be separated from body piece 32 by cutting weld joint 68 through use of a cutting torch, grinder saw, circular saw, hacksaw, or any other means provided that body piece 32 and/or tip piece 38 are not so damaged as to be not capable of remanufacturing. FIG. 3 shows corrosion 80 on distal tip 64 including on a peripheral shoulder 76 of body piece 32 as a result of exposure to prechamber 54, and possible migration of combustion gases into connecting joint 66. It can be noted peripheral shoulder 76 extends circumferentially around the longitudinal axis, and when device 30 is assembled peripheral shoulder 76 abuts tip piece 38. Remanufacturing of device 30 may include removal of corrosion 80 by use of a grinder 82 as seen in FIG. 3. In some embodiments of the present disclosure, corrosion 80 may be removed from body piece 32 by alternative means, such as chemical treatments. The illustrated stage of remanufacturing in FIG. 3 may require that corrosion removal continue until distal tip 64 and other surfaces of distal end 42 are substantially free of corrosion 80, thereby revealing the first type of material 58 from which the surfaces are formed for further processing, as can be seen in FIG. 3.

Figure 5:
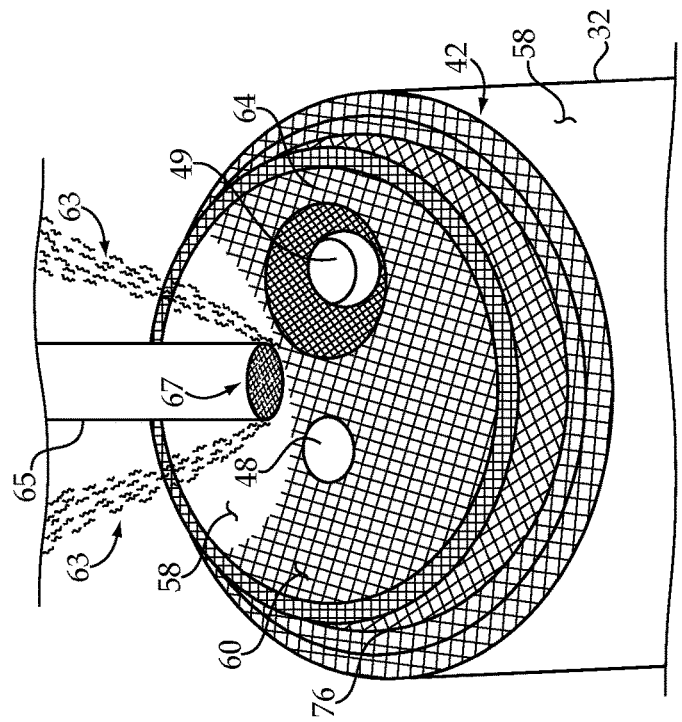
FIG. 5 is a diagrammatic view of a proximal body end of a body piece showing cladding, according to one embodiment.
Figure 4:
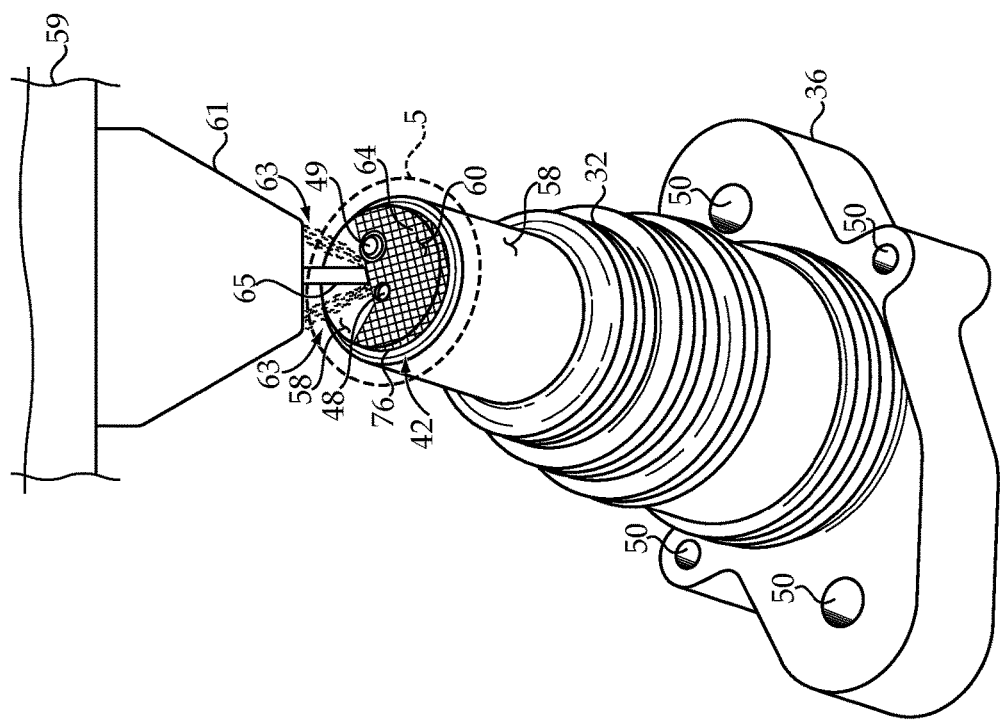
FIG. 4 is a diagrammatic view of a body piece of a prechamber ignition device showing cladding, according to one embodiment.

Referring now also to FIGS. 4 and 5, body piece 32 with cladding 62 applied to part of distal tip 64 is shown. After corrosion 80 has been removed from body piece 32, the second type of material 60 may be applied to distal tip 64 and peripheral shoulder 76 to form cladding 62. Cladding 62 may be deposited through use of laser cladding techniques as illustrated in FIGS. 4 and 5. In some embodiments, a cladding 62 may be applied using alternative methods, such as powder bed fusion, thermal spray, cold metal transfer (CMT), or vapor deposition, for example. A laser apparatus 59 is shown having a cladding nozzle 61 structured to deliver a feedstock 63 and direct a laser beam 65 capable of melting feedstock 63. Laser beam 65 forms a molten pool 67 on a surface substrate wherein feedstock 63 may be melted allowing a coating of molten feedstock 63 to be applied to the surface. Feedstock 63 may consist at least in part of the second type of material 60 and may be a metal powder as seen in FIGS. 4 and 5. While using the second type of material 60 to form cladding 62 provides a practical strategy, the present disclosure is not thusly limited. Suitable cladding materials include any material capable of living in prechamber combustion conditions and being metallurgically compatible with the typically ferrous materials of body piece 32 as well as the second material of which tip piece 38 is formed. In some embodiments, feedstock 63 may be wire or the like. Supply of feedstock 63 may correspond with movement of laser beam 65 about the substrate surface such that a continuous supply of molten feedstock 63 is provided. As the molten pool 67 cools, molten feedstock 63 hardens, forming cladding 62, and metallurgically bonding cladding 62 to the material forming body piece 32. Thickness of cladding 62 may be any suitable thickness depending on the particular application. For example, cladding 62 may have a thickness between about 2 µm and about 1.5 mm for a single layer of cladding, between about 4 µm and about 3 mm for a double layer of cladding and so on. Cladding 62 may be of such a thickness that it has a negligible effect on the mechanical configuration of connecting joint 66 thereby requiring no additional machining or other alteration to body piece 32 or tip piece 38. In some embodiments, alterations to body piece 32 or tip piece 38 may be desirable after application of cladding 62, however. In the present embodiment, cladding 62 formed from the second type of material 60 may protect body piece 32 from corrosion 80 when device 30 is in use by shielding the material of which body piece 32 is formed from combustion gases in the prechamber combustion environment.

Once corrosion 80 has been removed from body piece 32 and cladding 62 has been applied as herein contemplated, device 30 may be reassembled by coupling tip piece 38 with body piece 32. Reassembly of device 30 having cladding 62 can provide prechamber 54 formed in an entirety by the second type of material 60, or by the second type of material 60 and another type of material of which cladding is formed. Tip piece 38 may be new or used.

Figures 6, 7:
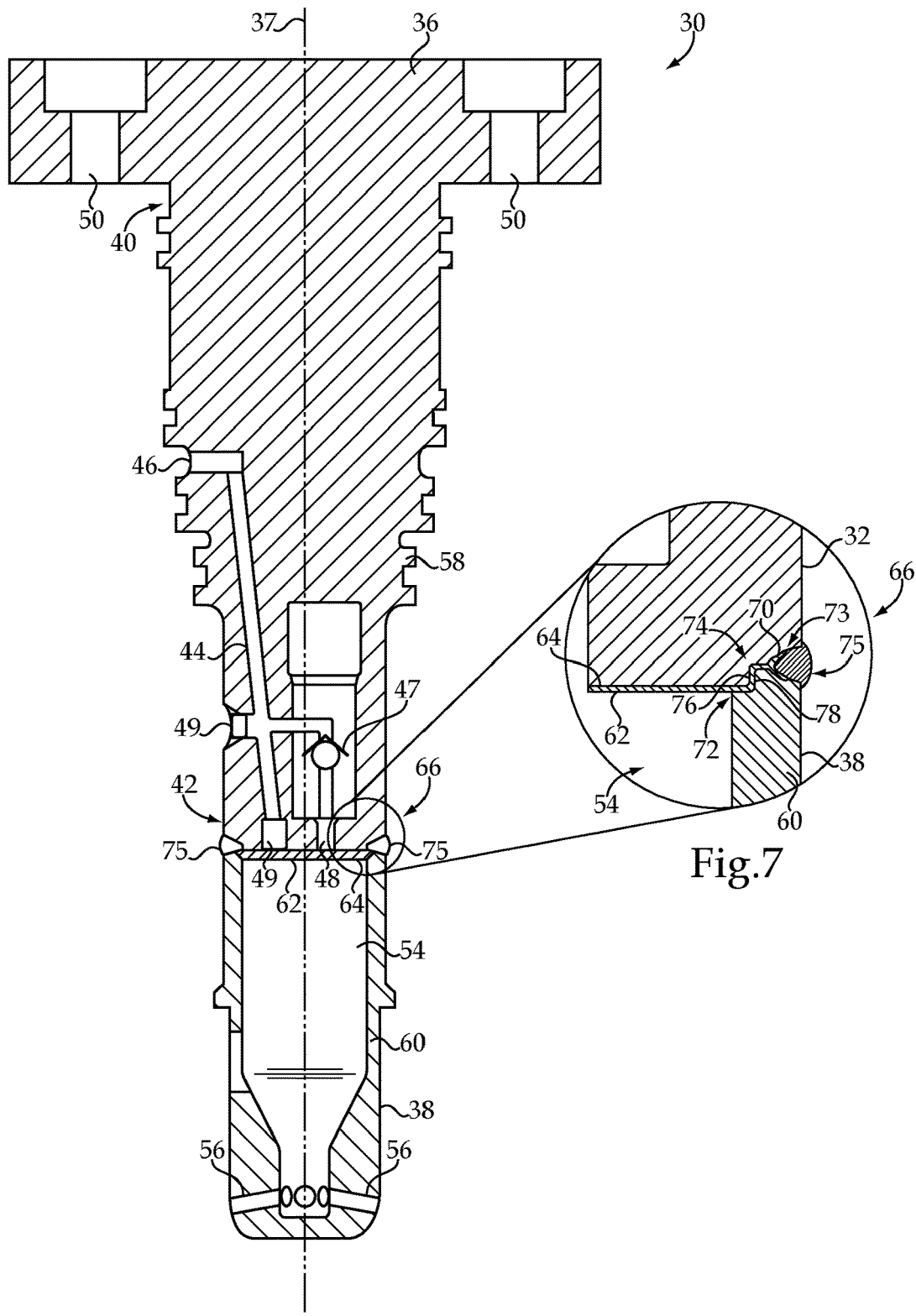
FIG. 6 is a sectioned diagrammatic view of a prechamber ignition device, according to one embodiment.
FIG. 7 is an enlarged sectioned diagrammatic view of a prechamber ignition device, according to one embodiment.

Referring now also to FIGS. 6 and 7, device 30 after remanufacturing is shown illustrating additional features. Tip piece 38 may be attached to body piece 32 having cladding 62 on distal tip 64 and peripheral shoulder 76 by laser welding at weld joint 73, forming a weld bead 75. It can also be seen that fuel outlet 48 extends through cladding 62. Cladding 62 may have a radial extent in directions normal to longitudinal axis 37 that is at least as great as a radial extent of prechamber 54 in directions normal to longitudinal axis 37. FIG. 6 shows prechamber 54 completely surrounded by the second type of material 60, thereby preventing corrosion from forming on distal tip 64 and peripheral shoulder 76 of body piece 32. FIG. 7 is an enlarged view of box 7 in FIG. 6 showing additional features of connecting joint 66. Cladding 62 coats distal tip 64 and peripheral shoulder 76. Connecting joint 66 of remanufactured device 30 may have a radially inward edge 72 such that prechamber 54 is defined in an entirety by the second type of material 60. The second type of material forming tip piece 38 abuts cladding 62 at a radially inward edge of connecting joint 66. Weld bead 75 may have a radially inward surface at or adjacent to a welded interface 70 formed by melding the second type of material 60 or other type of material from cladding 62 and tip piece 38. The heat applied to weld joint 73 may cause the material 60 of cladding 62 and tip piece 38 to fuse together, at least in part, thereby forming welded interface 70, in turn forming connecting joint 66. Also shown in FIG. 7, an inner ledge surface 78 of tip piece 38 may be structured to receive peripheral shoulder 76, with peripheral shoulder 76 shaped so as to form a stepped profile 74. FIG. 7 also shows that cladding 62 may not affect the stepped profile 74, therefore requiring no substantial machining or alteration of tip piece 38 other than conventional final or finish machining. Welded interface 70 can inhibit migrating of combustion gases between body piece 32 and tip piece 38. It should further be appreciated that the geometry of the interface between body piece 32 and tip piece 38 could be varied from what is depicted and specifically described herein. Once tip piece 38 has been welded to body piece 32, device 30 can be installed in engine 10, equipped with a spark plug, and placed in service.

INDUSTRIAL APPLICABILITY

As noted above, the use of a prechamber ignition device can be desirable in order to facilitate combustion of certain fuels and under certain engine operating conditions. However, the higher combustion temperatures characteristic of lean fuel/air mixtures and otherwise harsh conditions in prechamber ignition devices may produce high temperature oxidation that decreases the service life of such devices from what might otherwise be attained. While tip piece 38 may typically be formed of the second type of material 60, thereby protecting it from the harsh conditions present in prechamber 54, body piece 32 may not be afforded any similar protection, causing body piece 32 to become corroded through regular use unless manufactured or remanufactured according to the present disclosure. Frequently this corrosion can also expand into any pores, voids, joints, or the like formed by or present at the intersection of the body piece and the tip piece, which may compromise a prechamber assembly by weakening connecting joint 66 or damaging the body piece or otherwise rendering the device unsuited for further service. Engines like those contemplated in the present disclosure typically are used heavily in the field, accruing thousands of service hours relatively quickly and thereby requiring regular replacement of prechamber ignition devices. The use of remanufactured parts as contemplated herein may reduce the costs of maintaining such engines by providing increased service life through resistance to corrosion.

Referring to the drawings generally, device 30 may be removably installed in engine 10, which may allow for removal and remanufacturing independent of other components. Different embodiments of device 30 may lend themselves to different types or strategies for remanufacturing, but will still generally be amenable to the technique of separating tip piece 38 from body piece 32, removing corrosion from distal end 42 of body piece 32, and forming cladding 62 of the second type of material 60 thereon. While the foregoing description contemplates remanufacturing, it should be appreciated that it may be desirable to apply the present disclosure to production of new devices 30 as well, thereby providing cladding 62 of the second type of material 60 or another material on body piece 32 before use in engine 10.

The present description is for illustrative purposes only, and should not be construed to narrow the breadth of the present disclosure in any way. Thus, those skilled in the art will appreciate that various modifications might be made to the presently disclosed embodiments without departing from the full and fair scope of the present disclosure. Other aspects, features, and advantages will be apparent from an examination of the attached drawings and appended claims.

What is claimed is:

1. A method of making a prechamber ignition device for an internal combustion engine, the method comprising:
    attaching a body piece for a prechamber ignition device formed at least predominantly of a first type of material to a tip piece for a prechamber ignition device formed at least predominantly of a second type of material, the body piece having formed therein a fuel passage connecting to a fuel outlet, and the tip piece having formed therein a prechamber placed in fluid communication with the fuel outlet by way of the attaching of the body piece to the tip piece, and at least one ignition outlet from the prechamber; and
    forming a cladding upon the body piece that coats the body piece such that upon attaching the body piece to the tip piece the cladding is positioned to shield the first type of material from combustion gases within the prechamber, and the cladding being limited in extent to the body piece such that the tip piece is uncoated by the cladding.

2. The method of claim 1 wherein the attaching of the body piece to the tip piece further includes attaching the body piece and the tip piece by way of a welded connecting joint that touches the tip piece and the body piece.

3. The method of claim 2 wherein the cladding is formed at least predominantly of the second type of material, and the welded connecting joint is formed in part by a welded interface of the second type of material forming the tip piece and the second type of material forming the cladding.

4. The method of claim 1 wherein the forming of the cladding includes forming the cladding upon a distal end surface of the body piece prior to the attaching of the body piece to the tip piece.

5. The method of claim 4 wherein the forming of the cladding includes forming the cladding from a nickel and chromium alloy of iron or a stainless steel.

6. The method of claim 5 wherein the forming of the cladding further includes forming the cladding to have a peripheral shoulder forming a stepped profile, and the attaching of the body piece to the tip piece further includes attaching the body piece to the tip piece such that the peripheral shoulder abuts the tip piece.

7. The method of claim 6 wherein the cladding is formed of the second type of material, and the attaching of the body piece to the tip piece further includes attaching the body piece to the tip piece such that the prechamber is formed in an entirety by the second type of material.

8. The method of claim 1 wherein the body piece is a used body piece from a used prechamber ignition device removed from service in an internal combustion engine, and further comprising disassembling the used body piece from a used tip piece prior to the attaching of the used body piece to a tip piece and the forming of the cladding.

9. A method of remanufacturing a prechamber ignition device for an internal combustion engine, the method comprising:
    receiving a used body piece of a prechamber ignition device removed from service in an internal combustion engine, the used body piece being formed at least predominantly of a first type of material and having formed therein a fuel passage connecting to a fuel outlet;
    attaching the used body piece to a tip piece formed at least predominantly of a second type of material, the tip piece having formed therein a prechamber placed in fluid communication with the fuel outlet by way of the attaching of the used body piece to the tip piece, and at least one ignition outlet from the prechamber; and
    forming a cladding upon the used body piece that coats the used body piece such that upon attaching the used body piece to the tip piece the cladding is positioned to shield the first type of material from combustion gases within the prechamber, and the cladding being limited in extent to the used body piece such that the tip piece is uncoated by the cladding.

10. The method of claim 9 wherein the used body piece is attached to a mounting element, the used body piece defining a longitudinal axis, and the tip piece being arranged coaxially with the used body piece such that the prechamber is centered upon the longitudinal axis.

11. A method of making a prechamber ignition device for an internal combustion engine, the method comprising:
    attaching a body piece for a prechamber ignition device formed at least predominantly of a first type of material to a tip piece for a prechamber ignition device, the body piece being attached to a mounting element and defining a longitudinal axis, and having formed therein a fuel passage, and a fuel outlet connected to the fuel passage;
    the tip piece being formed at least predominantly of a second type of material and having formed therein a prechamber and at least one ignition outlet from the prechamber;
    the attaching of the body piece to the tip piece further including arranging the tip piece coaxially with the body piece, and such that the prechamber is centered about the longitudinal axis, the fuel passage extends longitudinally through the body piece, and the fuel outlet is in fluid communication with the prechamber; and
    forming a cladding upon the body piece that is formed of the second type of material and coats the body piece such that upon attaching the body piece to the tip piece the cladding is positioned to shield the first type of material from combustion gases within the prechamber, the prechamber is formed entirely by the second type of material, and the cladding is limited in extent to the body piece.

* * * * *